United States Patent
Kuras et al.

(10) Patent No.: US 11,038,442 B2
(45) Date of Patent: Jun. 15, 2021

(54) CONTROL SYSTEM FOR DC BUS REGULATION

(71) Applicant: Caterpillar Inc., Peoria, IL (US)

(72) Inventors: Brian Kuras, East Peoria, IL (US); Ankit Sharma, Peoria, IL (US); Lance Cowper, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 48 days.

(21) Appl. No.: 16/675,721

(22) Filed: Nov. 6, 2019

(65) Prior Publication Data
US 2021/0135605 A1    May 6, 2021

(51) Int. Cl.
| | | |
|---|---|---|
| B60W 20/10 | (2016.01) | |
| H02P 5/50 | (2016.01) | |
| B60L 15/20 | (2006.01) | |
| B62D 11/04 | (2006.01) | |
| B60K 6/46 | (2007.10) | |

(52) U.S. Cl.
CPC .............. H02P 5/50 (2013.01); B60L 15/20 (2013.01); B62D 11/04 (2013.01); B60K 6/46 (2013.01); B60L 2200/40 (2013.01); B60L 2240/12 (2013.01); B60Y 2200/411 (2013.01); B60Y 2200/412 (2013.01); B60Y 2200/414 (2013.01); B60Y 2200/91 (2013.01); B60Y 2200/92 (2013.01)

(58) Field of Classification Search
CPC ........ H02P 5/50; B60L 15/20; B60L 2240/12; B62D 11/04; B60Y 2200/91; B60W 20/10
See application file for complete search history.

(56) References Cited

U.S. PATENT DOCUMENTS

| | | | |
|---|---|---|---|
| 8,095,285 B2 | 1/2012 | Schifferer et al. | |
| 8,130,478 B2 | 3/2012 | Godbold et al. | |
| 8,415,909 B2 | 4/2013 | Ramamurthy et al. | |
| 9,018,878 B2 | 4/2015 | Hendrickson et al. | |
| 2005/0263331 A1* | 12/2005 | Sopko ................... | B60W 20/10 180/65.1 |
| 2015/0367837 A1 | 12/2015 | Tamai et al. | |
| 2018/0361878 A1 | 12/2018 | Akiyama | |
| 2019/0115858 A1 | 4/2019 | Shinoda | |
| 2019/0161076 A1 | 5/2019 | Plianos | |

FOREIGN PATENT DOCUMENTS

JP    2010012827 A    1/2010

* cited by examiner

*Primary Examiner* — Cortez M Cook
(74) *Attorney, Agent, or Firm* — Harrity & Harrity LLP

(57) ABSTRACT

A device that includes a memory and a processor is disclosed. The processor may be configured to receive a control signal for operating a plurality of traction motors of a work machine. The control signal may include information relating to an actual speed of the work machine, a target speed of the work machine, and a generator speed of a generator operatively coupled to the traction motors. The processor may be configured to determine respective torque commands associated with the traction motors based on the actual speed and the target speed, and determine a generator power limit based on the generator speed. The processor may be configured to determine a threshold based on the respective torque commands and the generator power limit, adjust the respective torque commands based on the threshold, and cause the traction motors to be operated based on the adjusted respective torque commands.

20 Claims, 4 Drawing Sheets

300 ─►

302

| | Power Demand (L) | Power Demand (R) | Total Power Demand | Generator Power Limit | Limit Ratio | Action |
|---|---|---|---|---|---|---|
| 304 — Balanced Within Limit | 270 kW | 270 kW | 540 kW | 650 kW | 1.000 | No Deration |
| 306 — Unbalanced Within Limit | 270 kW | 320 kW | 590 kW | 650 kW | 1.000 | No Deration |
| 308 — Balanced Limit Exceeded | 540 kW | 540 kW | 1080 kW | 650 kW | 0.602 | Apply Deration |
| 310 — Unbalanced Limit Exceeded | 540 kW | 270 kW | 810 kW | 650 kW | 0.802 | Apply Deration |

| | Torque Command (L) | Torque Command (R) | Limit Ratio | Derated Torque Command (L) | Derated Torque Command (R) |
|---|---|---|---|---|---|
| 304 — Balanced Within Limit | 600 Nm | 600 Nm | 1.000 | 600 Nm | 600 Nm |
| 306 — Unbalanced Within Limit | 600 Nm | 711 Nm | 1.000 | 600 Nm | 711 Nm |
| 308 — Balanced Limit Exceeded | 1200 Nm | 1200 Nm | 0.602 | 722 Nm | 722 Nm |
| 310 — Unbalanced Limit Exceeded | 1200 Nm | 600 Nm | 0.802 | 963 Nm | 481 Nm |

FIG. 3B

CONTROL SYSTEM FOR DC BUS REGULATION

TECHNICAL FIELD

The present disclosure relates generally to electric drive systems and, for example, to a control system for controlling an electric drive system.

BACKGROUND

Electric drive systems are increasingly used in place of mechanical drive systems both in on-highway and off-highway applications. In general, an electric drive system for a work machine includes an engine, a generator, a direct current (DC) bus, and a traction motor. The engine may include an internal combustion engine and/or another power source that is configured to generate mechanical power for rotating a rotor relative to a stator of the generator. The generator may convert the mechanical power into electric power that can be supplied to different electrical loads of the work machine via the DC bus. The DC bus may include two or more electrical terminals across which multiple loads can connect (e.g. in electrical parallel) and receive electrical power. For instance, the DC bus can be used to provide appropriate electrical power (e.g., via inverters, converters, and/or other circuitry) to the traction motor, an auxiliary device, and/or another load of the work machine. The traction motors may convert the electrical power into mechanical power (e.g., rotational power) suited to propel the work machine (e.g., via tracks, wheels, and/or other traction devices).

In some cases, such as in a dual-path or multi-path configuration, a work machine may include multiple traction motors that can be independently operated to drive multiple traction devices. For instance, a track-type tractor may use two parallel tracks (e.g., a left track and a right track) as traction devices which may be operated at different speeds and/or torque in order to steer, turn, and/or otherwise propel the track-type tractor in a particular direction. In such cases, each traction motor may need to be sufficiently sized, rated, and/or otherwise capable of independently propelling the track-type tractor. A combined power demanded by such traction motors can be significant (e.g., when multiple traction motors of the work machine are to be operated at full load). However, a single generator may not always be sufficiently sized and/or rated to sufficiently support the combined power demands of multiple traction motors. In such cases, when the power demanded by the traction motors exceeds a power limit of the generator, a bus voltage of the DC bus may collapse (e.g., decrease at a significant rate) or overvolt (e.g., increase at a significant rate), cause the work machine to halt, and/or cause another adverse effect. Although using larger and/or multiple generators may be possible solutions, such solutions are not always feasible due to cost, size, weight, and/or other constraints.

One attempt to control power on a multi-motion electric drive system is disclosed in U.S. Pat. No. 8,415,909, issued to Ramamurthy, et al., and filed on Apr. 22, 2010 ("the '909 patent"). In particular, the '909 patent discloses a motor control system for controlling two or more motor groups. The '909 patent discloses that the motor control system includes a power converter that receives power from a power source and converts the power to an intermediate power and an intermediate power link coupled to the power converter. The '909 patent discloses a controller that is configured to cause at least one motor driver to limit an amount of power delivered to one or more motors based on an amount of power that the power converter can produce. However, the '909 patent does not disclose a generator or a solution that sufficiently addresses power limitations of a generator, as described above. For instance, the '909 patent does not disclose determining a power limit of a generator or adjusting torque commands for operating one or more traction motors of a work machine based on a power limit of a generator.

A control system of the present disclosure overcomes or more of the shortcomings set forth above.

SUMMARY

According to some implementations, a method may include receiving a control signal for operating a plurality of traction motors of a work machine, the plurality of traction motors being in electrical communication with a generator of the work machine, and the control signal including information relating to an actual speed of the work machine, a target speed of the work machine, and a generator speed of the generator; determining respective torque commands associated with the plurality of traction motors based on the actual speed and the target speed; determining a total power demand associated with the plurality of traction motors based on the respective torque commands and respective actual motor speeds; determining a generator power limit based on the generator speed; determining a limit ratio based on the total power demand and the generator power limit; adjusting the respective torque commands of the plurality of traction motors based on the limit ratio; and causing an action to be performed based on the adjusted respective torque commands.

According to some implementations, a device may include one or more memories; and one or more processors, communicatively coupled to the one or more memories, configured to receive a control signal for operating a plurality of traction motors of a work machine, the control signal including information relating to an actual speed of the work machine, a target speed of the work machine, and a generator speed of a generator operatively coupled to the plurality of traction motors; determine respective torque commands associated with the plurality of traction motors based on the actual speed and the target speed; determine a generator power limit based on the generator speed; determine a threshold based on the respective torque commands and the generator power limit; adjust the respective torque commands based on the threshold; and cause the plurality of traction motors to be operated based on the adjusted respective torque commands.

According to some implementations, a work machine may include a first traction motor; a second traction motor; a generator operatively coupled to the first traction motor and the second traction motor; and a controller configured to receive information relating to an actual speed of the work machine, a target speed of the work machine, and a generator speed of the generator, determine, based on the actual speed and the target speed, a first torque command associated with the first traction motor and a second torque command associated with the second traction motor, determine a total power demand based on the first torque command and the second torque command, determine a generator power limit based on the generator speed, determine a threshold based on the total power demand and the generator power limit, adjust the first torque command and the second torque command based on the threshold to obtain an adjusted first torque command and an adjusted second torque command, and cause an action to be performed based on the adjusted first torque command and the adjusted second torque command.

BRIEF DESCRIPTION OF THE DRAWINGS

FIGS. 3A and 3B are diagrams of an example implementation of a control system described herein.

DETAILED DESCRIPTION

Figure 1:
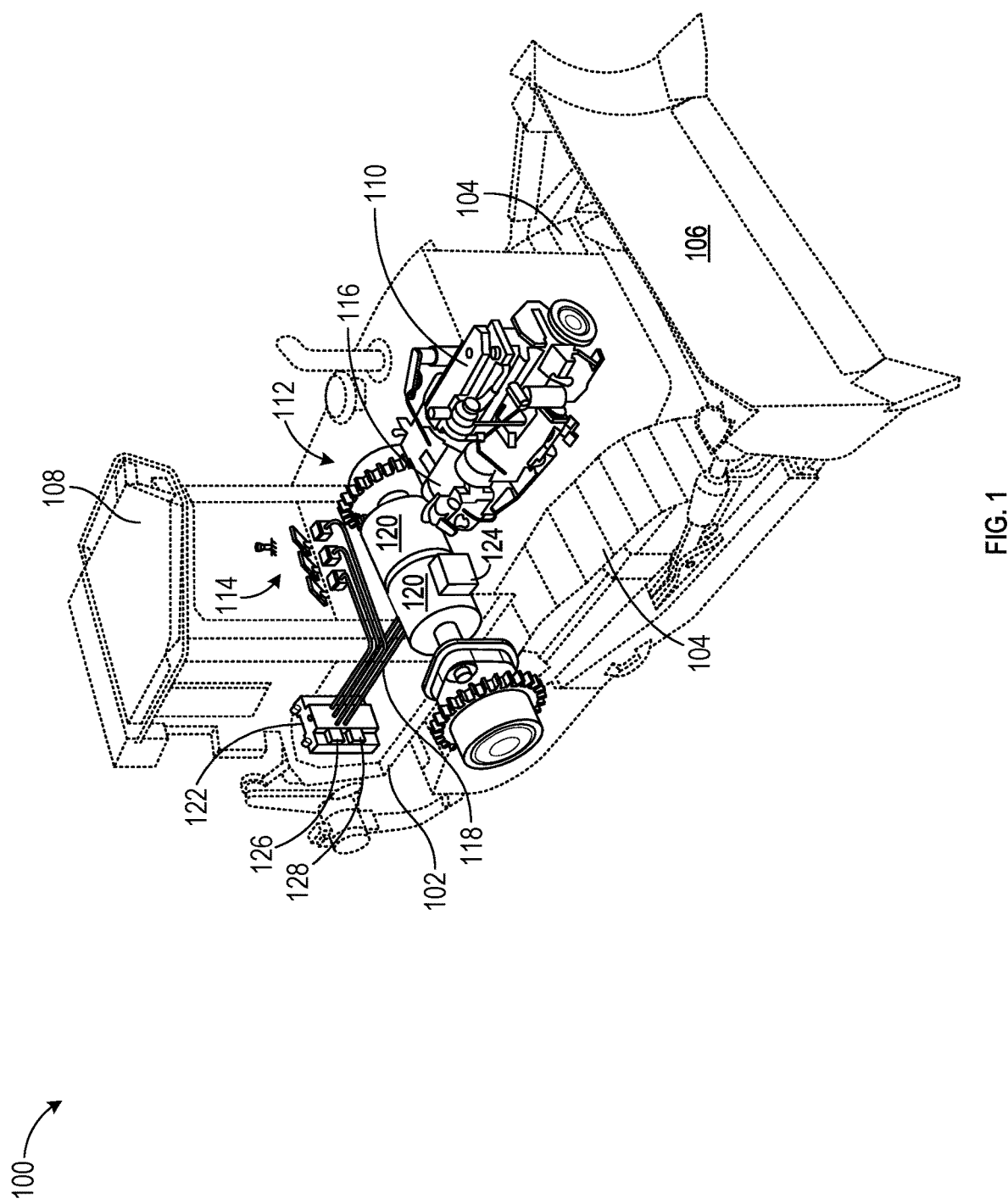
FIG. 1 is a diagram of an example work machine described herein.

FIG. 1 is a diagram of an example work machine 100 described herein. Work machine 100 may include a tractor, a dozer, a loader, a truck, a motor grader, an excavator, a paver, and/or another work machine 100 configured to perform a task associated with the operation. As shown in FIG. 1, work machine 100 includes a frame 102, traction elements 104, an implement 106, an operator cab 108, an engine 110, and an electric drive system 112. Traction elements 104 may include tracks, wheels, and/or other traction devices that are movably coupled to frame 102 and caused to be driven by electric drive system 112 to propel work machine 100. Implement 106 may include a blade, a ripper, a winch, a bucket, a sheer, a hammer, and/or another work tool that is movably coupled to frame 102 and configured to perform a task associated with work machine 100. Operator cab 108 may be coupled to frame 102 and provide a user interface 114 for an operator of work machine 100. User interface 114 may include an input device (e.g., a joystick, a lever, a button, a dial, a steering wheel, a pedal, a touchscreen device, and/or the like) configured to receive information from the operator for operating work machine 100 (e.g., a target travel speed, a target track or wheel speed, a target engine speed, a steering command, and/or the like), and/or an output device (e.g., a gauge, a display, a speaker, a haptic feedback device, and/or the like) configured to output information to the operator.

Engine 110 includes a diesel engine, a gasoline engine, a natural gas engine, and/or another power source configured to generate mechanical power that can be used to enable electric drive system 112. Electric drive system 112 may be configured in a dual-path or multi-path arrangement and capable of simultaneously and independently operating multiple traction motors 120 of work machine 100. Electric drive system 112 may include a generator 116, a common bus 118, a set of traction motors 120, a controller 122, and a set of sensors 124. Generator 116 may include a rotor that is mechanically coupled to engine 110 and configured to rotate relative to a stator to induce an electrical current (e.g., an alternating current (AC)) via one or more windings of the stator. Common bus 118 may include electrical terminals, connectors, capacitors, inverters, converters, and/or other circuit components configured to convert an AC voltage (e.g., a three-phase or multi-phase voltage) from generator 116 into a bus voltage (e.g., a DC voltage) that is communicated to traction motors 120, controller 122, and/or another electrical load of work machine 100. In some examples, common bus 118 may convert the bus voltage into a different DC voltage and/or an AC voltage suited to operate the connected loads. Traction motors 120 may include an electric motor configured to convert the electrical power from common bus 118 into mechanical power to cause movement of traction elements 104.

Controller 122 includes a processor 126 and a memory 128. Processor 126 is implemented in hardware, firmware, and/or a combination of hardware and software capable of being programmed to perform a function associated with electric drive system 112, engine 110, and/or work machine 100. Memory 128 includes a random-access memory (RAM), a read only memory (ROM), and/or another type of dynamic or static storage device that stores information and/or instructions to be performed by processor 126. Sensors 124 may include a combination of a measurement device, a sensing device, a switch, an encoder, and/or another device configured to obtain sensor data (e.g., information relating to an operating condition of electric drive system 112, engine 110, and/or work machine 100). For example, sensors 124 may be configured to provide information relating to a travel speed of work machine 100, a track or wheel speed, a traction motor speed, an engine speed, a generator speed, a steering angle, a bus voltage, and/or another operating condition. In some examples, sensors 124 may include a global positioning system (GPS) device, a global navigation satellite system (GNSS) device, and/or another location sensing device configured to provide a location of work machine 100. If work machine 100 includes an implement 106, sensors 124 may provide information relating to an operating condition of implement 106.

As indicated above, FIG. 1 is provided as an example. Other examples may differ from what is described in connection with FIG. 1.

Figure 2:
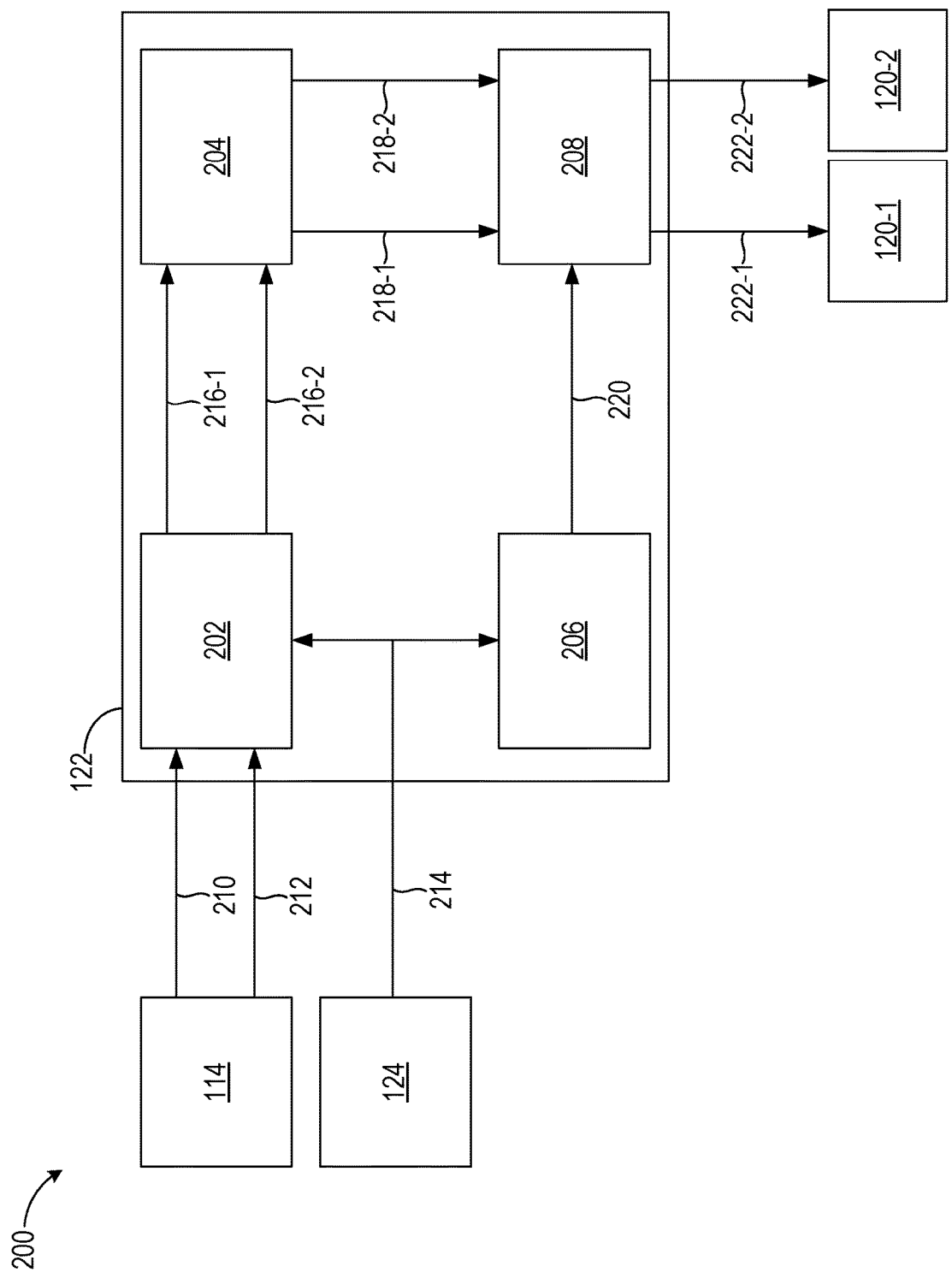
FIG. 2 is a diagram of an example control system described herein.

FIG. 2 is a diagram of an example control system 200 described herein. As shown in FIG. 2, control system 200 may include controller 122 that is in electrical communication (e.g., via common bus 118) with user interface 114, sensors 124, and traction motors 120. Controller 122 may include a speed control module 202, a torque control module 204, a limit estimation module 206, and a deration control module 208 configured to perform one or more functions associated with operating electric drive system 112. For example, controller 122 may be configured to receive a control signal provided by an operator via user interface 114, determine a total power demand associated with traction motors 120, determine a power threshold based on the total power demand and a generator power limit, and adjust respective torque commands of traction motors 120 based on the power threshold. In some examples, controller 122 may be configured with fewer modules, additional modules, and/or a different arrangement of modules. Controller 122 may be in electrical communication with user interface 114, sensors 124, and traction motors 120 via an inverter, a converter, and/or another circuit component of common bus 118. Additionally, or alternatively, controller 122 may be in electrical communication with engine 110, generator 116, and/or another electrical load of common bus 118.

As further shown in FIG. 2, speed control module 202 may be configured to receive one or more control signals for operating traction motors 120 of work machine 100 via user interface 114 and/or sensors 124. For example, the control signal may include a target speed 210 and a steering command 212 (e.g., provided via user interface 114) and sensor data 214 (e.g., provided via sensors 124). Target speed 210 may correspond to a travel speed, a track speed, a wheel speed, and/or an engine speed of work machine 100 that is requested by an operator. Steering command 212 may correspond to a target direction and/or a target steering angle of work machine 100 that is requested by the operator. Sensor data 214 may include information relating to a travel speed, a track speed, a wheel speed, a traction motor speed, an engine speed, a generator speed, a steering angle, and/or a bus voltage of work machine 100 that is observed by sensors 124. In some examples, such as when sensors 124 are in electrical communication with an input device of user interface 114, speed control module 202 may obtain and/or derive target speed 210 and/or steering command 212 based on sensor data 214 provided by sensors 124. In some examples, such as when user interface 114 includes an output device that provides sensor data 214 to the operator, speed control module 202 may obtain sensor data 214 via user interface 114.

In some implementations, speed control module 202 may be configured to determine speed commands 216 based on target speed 210, steering command 212, and/or sensor data 214 (e.g., an actual speed of work machine 100). For example, speed control module 202 may determine a first speed command 216-1 for operating a first traction motor 120-1 (e.g., coupled to a traction element 104 on a left side of work machine 100) and a second speed command 216-2 for operating a second traction motor 120-2 (e.g., coupled to a traction element 104 on a right side of work machine 100). In cases when steering command 212 is null (e.g., the operator does not provide steering input), first speed command 216-1 and second speed command 216-2 may be substantially equal (e.g., to cause work machine 100 to travel in a straight path). In cases when steering command 212 is a non-zero value (e.g., the operator provides steering input), first speed command 216-1 and second speed command 216-2 may be different (e.g., proportioned between traction motors 120 in a manner that causes work machine 100 to steer in a direction requested by the operator). Additionally, or alternatively, speed control module 202 may adjust speed commands 216 (e.g., using a smoothing process, an anti-windup process, a deration process, and/or the like) to refine and/or facilitate operation of traction motors 120.

As further shown in FIG. 2, torque control module 204 may be configured to receive speed commands 216 provided by speed control module 202, and determine respective torque commands 218 for operating traction motors 120. For example, a first torque command 218-1 may correspond to an amount of torque to be produced by first traction motor 120-1 to satisfy first speed command 216-1, and a second torque command 218-2 may correspond to an amount of torque to be produced by second traction motor 120-2 to satisfy second speed command 216-2. Torque commands 218 may enable traction motors 120 to achieve a travel speed and/or a travel direction requested by an operator of work machine 100. In some examples, torque control module 204 may use a proportional integral derivative (PID) controller and/or another controller capable of determining appropriate torque commands 218 that enable traction motors 120 to satisfy target speed 210 and/or steering command 212. In some examples, torque control module 204 may receive target speed 210 and/or steering command 212 from user interface 114, sensor data 214 from sensors 124, and/or a single speed command 216 from speed control module 202, and proportion torque commands 218 between traction motors 120 based on steering command 212.

As further shown in FIG. 2, limit estimation module 206 may be configured to receive sensor data 214 from sensors 124, and determine a generator power limit 220 based on sensor data 214. For example, limit estimation module 206 may determine a generator speed (e.g., a rotational speed of a rotor relative to a stator of generator 116) based on information included in sensor data 214, and/or derive the generator speed based on an engine speed, a travel speed, and/or other information included in sensor data 214. In some examples, limit estimation module 206 may determine a bus voltage (e.g., a target bus voltage and/or an actual bus voltage) of common bus 118 based on sensor data 214, and determine a generator torque based on the bus voltage. Limit estimation module 206 may determine the generator torque using a PID controller and/or another controller configured to determine the generator torque at a particular instance. Based on the generator speed and the generator torque, limit estimation module 206 may be configured to determine generator power limit 220 (e.g., a maximum amount of electrical power that generator 116 can output at the generator speed). In some examples, such as when user interface 114 includes an output device that provides sensor data 214 to the operator, limit estimation module 206 may obtain sensor data 214 via user interface 114.

As further shown in FIG. 2, deration control module 208 may be configured to receive torque commands 218 provided by torque control module 204, receive generator power limit 220 provided by limit estimation module 206, and determine derated torque commands 222 for operating traction motors 120. Deration control module 208 may determine respective traction motor speeds of traction motors 120 (e.g., based on sensor data 214 provided by sensors 124), and determine respective power demands of traction motors 120 based on torque commands 218 and the respective traction motor speeds (e.g., by multiplying torque commands 218 with respective traction motor speeds). For example, deration control module 208 may determine a first power demand associated with first traction motor 120-1 based on first torque command 218-1 and a second power demand associated with second traction motor 120-2 based on second torque command 218-2. Deration control module 208 may determine a total power demand based on the respective power demands (e.g., based on an aggregation or a sum of the respective power demands), determine a threshold based on the total power demand and generator power limit 220, and use the threshold to derate and/or otherwise adjust torque commands 218.

In some implementations, deration control module 208 may be configured to define the threshold as a limit ratio (e.g., a ratio between generator power limit 220 and the total power demand associated with traction motors 120). Additionally, or alternatively, the threshold may be defined using a percentage, a fraction, and/or another value that defines a relationship between the total power demand with generator power limit 220. Deration control module 208 may adjust torque commands 218 by the limit ratio to determine derated torque commands 222. For example, deration control module 208 may multiply first torque command 218-1 by the limit ratio to determine a first derated torque command 222-1, and multiply second torque command 218-2 by the limit ratio to determine a second derated torque command 222-2. The limit ratio may be configured to ensure the total power demand associated with traction motors 120 approximates and does not exceed generator power limit 220. For example, when the total power demand exceeds generator power limit 220, the limit ratio may correspond to a value of less than 1 such that multiplication of torque commands 218 by the limit ratio derates torque commands 218. When the total power demand is less than or substantially equal to generator power limit 220, the limit ratio may saturate to a value of 1 such that multiplication of torque commands 218 by the limit ratio does not increase or otherwise alter torque commands 218.

In some implementations, deration control module 208 may be configured to transmit derated torque commands 222 to respective traction motors 120 (e.g., via common bus 118) and/or otherwise enable traction motors 120 to operate according to derated torque commands 222. Additionally, or alternatively, deration control module 208 may be configured to compare the total power demand associated with traction motors 120 with generator power limit 220 to determine whether the total power demand exceeds generator power limit 220. If the total power demand exceeds generator power limit 220, deration control module 208 may determine the limit ratio, and derate respective torque commands 218 by the limit ratio. If the total power demand does not exceed generator power limit 220, deration control module 208 may pass torque commands 218 to respective traction motors 120 without modification. Deration control module 208 may monitor for changes in the total power demand and/or generator power limit 220 intermittently, periodically, and/or continuously in real-time to ensure common bus 118 is regulated under different operating conditions. Deration control module 208 may thereby maintain balance across common bus 118 and prevent collapse or overvoltage of a bus voltage of common bus 118.

As indicated above, FIG. 2 is provided as an example. Other examples may differ from what is described in connection with FIG. 2.

FIGS. 3A and 3B are diagrams of an example implementation 300 of control system 200 described herein. As shown in FIG. 3A, and by reference number 302, control system 200 may determine respective power demands of traction motors 120, determine a total power demand based on an aggregation of the respective power demands, determine a generator power limit, determine a limit ratio based on a ratio between the generator power limit and the total power demand, and cause an action to be performed in connection with the limit ratio, as described above. In a first example 304, the respective power demands (e.g., 270 kW) of traction motors 120 may be balanced (e.g., operator does not provide steering input and/or output load is equally split to each traction motor 120) and the total power demand (e.g., 540 kW) may be within the generator power limit (e.g., 650 kW). Since the total power demand is less than the generator power limit, the limit ratio may saturate to a value of 1, and control system 200 may not apply deration. In a second example 306, the respective power demands (e.g., 270 kW and 320 kW) of traction motors 120 may be unbalanced (e.g., operator provides steering input and/or output load is greater on one traction motor 120 than another traction motor 120) and the total power demand (e.g., 590 kW) may be within the generator power limit (e.g., 650 kW). Since the total power demand is less than the generator power limit, the limit ratio may saturate to a value of 1, and control system 200 may not apply deration.

As further shown in FIG. 3A, and according to a third example 308, the respective power demands (e.g., 540 kW) of traction motors 120 may be balanced and the total power demand (e.g., 1080 kW) may exceed the generator power limit (e.g., 650 kW). Since the total power demand is greater than the generator power limit, the limit ratio may be a value that is less than 1 (e.g., 0.602), and control system 200 may apply deration. In a fourth example 310, the respective power demands (e.g., 540 kW and 270 kW) of traction motors 120 may be unbalanced and the total power demand (e.g., 810 kW) may exceed the generator power limit (e.g., 650 kW). Since the total power demand is greater than the generator power limit, the limit ratio may be a value that is less than 1 (e.g., 0.802), and control system 200 may apply deration. The generator power limit is shown with a single value (e.g., 650 kW) for illustrative purposes. It will be understood that the generator power limit may vary over time (e.g., based on a change in a generator speed, a generator torque, an engine speed, and/or another operating condition of work machine 100), and that control system 200 may be configured to update the limit ratio based on changes in the generator power limit.

As shown in FIG. 3B, and by reference number 312, control system 200 may adjust respective torque commands of traction motors 120 based on the limit ratio, as described above. In the first example 304, control system 200 may not apply deration, or use the limit ratio (e.g., 1.000) to provide derated torque commands (e.g., 600 Nm) that are effectively unmodified. In the second example 306, control system 200 may not apply deration, or use the limit ratio (e.g., 1.000) to provide derated torque commands (e.g., 600 Nm and 711 Nm) that are effectively unmodified. In the third example 308, control system 200 may apply deration and adjust the torque commands (e.g., 1200 Nm) based on the limit ratio (e.g., 0.602), to provide derated torque commands (e.g., 722 Nm). In the fourth example 310, control system 200 may apply deration and adjust the torque commands (e.g., 1200 Nm and 600 Nm) based on the limit ratio (e.g., 0.802), to provide derated torque commands (e.g., 963 Nm and 481 Nm). In this way, control system 200 may provide derated torque commands that are configured to deliver an amount of power to traction motors 120 that approximates and does not exceed power limit of generator 116.

As indicated above, FIGS. 3A and 3B are provided as an example. Other examples may differ from what is described in connection with FIGS. 3A and 3B.

Figure 4:
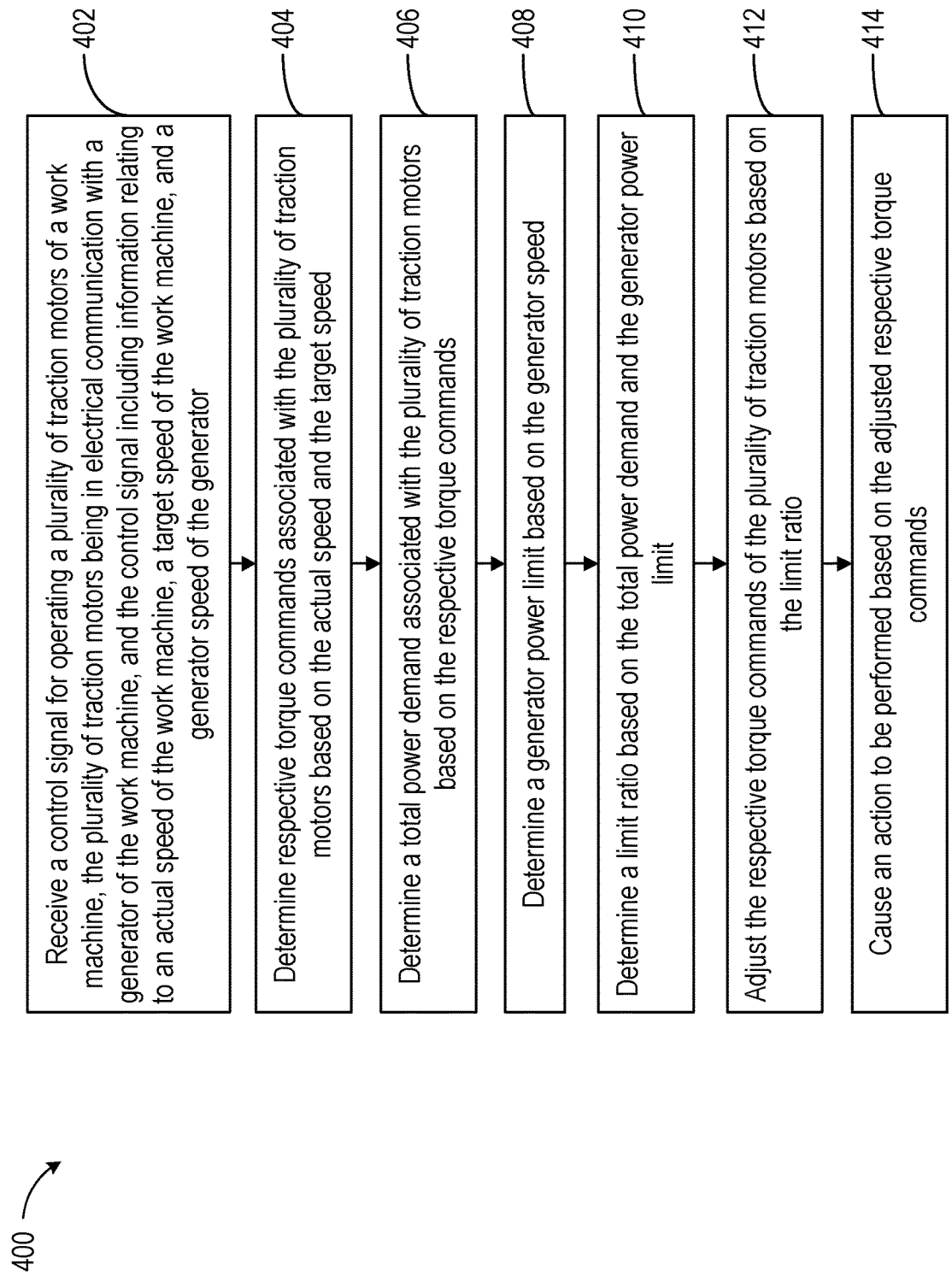
FIG. 4 is a flow chart of an example process for controlling an electric drive system.

FIG. 4 is a flow chart of an example process 400 for controlling an electric drive system (e.g., electric drive system 112 of work machine 100). One or more process blocks of FIG. 4 may be performed by a controller (e.g., controller 122 of control system 200 and/or work machine 100) and/or by another component or a group of components separate from or including the controller (e.g., speed control module 202, torque control module 204, limit estimation module 206, deration control module 208, and/or the like).

As shown in FIG. 4, process 400 may include receiving a control signal for operating a plurality of traction motors of a work machine, the plurality of traction motors being in electrical communication with a generator of the work machine, and the control signal including information relating to an actual speed of the work machine, a target speed of the work machine, and a generator speed of the generator (block 402). For example, the controller (e.g., using processor 126, memory 128, and/or the like) may receive a control signal for operating a plurality of traction motors of a work machine, as described above. The plurality of traction motors may be in electrical communication with a generator of the work machine. The control signal may include information relating to an actual speed of the work machine, a target speed of the work machine, and a generator speed of the generator.

As further shown in FIG. 4, process 400 may include determining respective torque commands associated with the plurality of traction motors based on the actual speed and the target speed (block 404). For example, the controller (e.g., using processor 126, memory 128, and/or the like) may determine respective torque commands associated with the plurality of traction motors based on the actual speed and the target speed, as described above.

As further shown in FIG. 4, process 400 may include determining a total power demand associated with the plurality of traction motors based on the respective torque commands (block 406). For example, the controller (e.g., using processor 126, memory 128, and/or the like) may determine a total power demand associated with the plurality of traction motors based on the respective torque commands, as described above.

As further shown in FIG. 4, process 400 may include determining a generator power limit based on the generator speed (block 408). For example, the controller (e.g., using processor 126, memory 128, and/or the like) may determine a generator power limit based on the generator speed, as described above.

As further shown in FIG. 4, process 400 may include determining a limit ratio based on the total power demand and the generator power limit (block 410). For example, the controller (e.g., using processor 126, memory 128, and/or the like) may determine a limit ratio based on the total power demand and the generator power limit, as described above.

As further shown in FIG. 4, process 400 may include adjusting the respective torque commands of the plurality of traction motors based on the limit ratio (block 412). For example, the controller (e.g., using processor 126, memory 128, and/or the like) may adjust the respective torque commands of the plurality of traction motors based on the limit ratio, as described above.

As further shown in FIG. 4, process 400 may include causing an action to be performed based on the adjusted respective torque commands (block 414). For example, the controller (e.g., using processor 126, memory 128, and/or the like) may cause an action to be performed based on the adjusted respective torque commands, as described above.

Process 400 may include variations and/or additional implementations to those described in connection with FIG. 4, such as any single implementation or any combination of implementations described elsewhere herein. Although FIG. 4 shows example blocks of process 400, in some examples, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

Electric drive systems are increasingly used in place of mechanical drive systems both in on-highway and off-highway applications. In general, an electric drive system for a work machine includes an engine, a generator, a DC bus, and a traction motor. The engine may include an internal combustion engine and/or another power source that is configured to generate mechanical power for rotating a rotor relative to a stator of the generator. The generator may convert the mechanical power into electric power that can be supplied to different electrical loads of the work machine via the DC bus. The DC bus may include two or more electrical terminals across which multiple loads can connect and receive electrical power. For instance, the DC bus can be used to provide appropriate electrical power (e.g., via inverters, converters, and/or other circuitry) to the traction motor, an auxiliary device, and/or another load of the work machine. The traction motors may convert the electrical power into mechanical power (e.g., rotational power) suited to propel the work machine (e.g., via tracks, wheels, and/or other traction devices).

In some cases, such as in a dual-path or multi-path configuration, a work machine may include multiple traction motors that can be independently operated to drive multiple traction devices. For instance, a track-type tractor may use two parallel tracks (e.g., a left track and a right track) as traction devices which may be operated at different speeds and/or torque in order to steer, turn, and/or otherwise propel the track-type tractor in a particular direction. In such cases, each traction motor may need to be sufficiently sized, rated, and/or otherwise capable of independently propelling the track-type tractor. A combined power demanded by such traction motors can be significant (e.g., when multiple traction motors of the work machine are to be operated at full load). However, a single generator may not always be sufficiently sized and/or rated to sufficiently support the combined power demands of multiple traction motors. In such cases, when a combined power demanded by the traction motors exceeds a power limit of the generator, a bus voltage of the DC bus may collapse or overvolt, cause the work machine to halt, and/or cause another adverse effect. Although using larger and/or multiple generators may be possible solutions, such solutions are not always feasible due to cost, size, weight, and/or other constraints.

A control system described herein provides a solution that regulates a common bus of an electric drive system having a single generator and multiple tractions motors (e.g., in a dual-path or multi-path configuration). For instance, the control system may be configured to determine a total power demand associated with the traction motors in an electric drive system, determine a power limit of the generator, determine a threshold based on the total power demand and the generator power limit, and adjust respective torque commands of the traction motors based on the threshold. In some examples, the control system may define the threshold using a limit ratio that is based on a ratio between the generator power limit and the total power demand, and derate the respective torque commands of the traction motors by the limit ratio. For instance, the limit ratio may correspond to a value that is less than 1 when the total power demand exceeds the generator power limit, and saturates to a value of 1 when the total power demand is less than or substantially equal to the generator power limit. The control system may thereby be configured to balance the total power demand relative to the generator power limit during operation of the electric drive system.

Accordingly, the control system described herein overcomes one or more problems associated with currently available electric drive systems. For instance, by determining a limit ratio based on a power limit of the generator and a total power demand of the traction motors, and by derating respective torque commands of the traction motors based on the limit ratio, the control system ensures that the total power demand remains balanced with the generator power limit. Furthermore, by adjusting the limit ratio based on changes in the total power demand and/or the generator power limit, the control system is able to effectively regulate and prevent collapse or overvolt of a common bus of the electric drive system under varying operating conditions. The control system also enables generators of limited and/or varying capacities to be effectively used in a multi-path configuration, and thereby overcomes a need to implement a larger generator to support multiple traction motors. The control system further overcomes a need to implement multiple generators in an electric drive system, and thereby conserves computational resources that may otherwise be needed to control multiple generators.

What is claimed is:

1. A method, comprising:
   receiving a control signal for operating a plurality of traction motors of a work machine, the plurality of traction motors being in electrical communication with a generator of the work machine, and the control signal including information relating to an actual speed of the work machine, a target speed of the work machine, and a generator speed of the generator;

determining respective torque commands associated with the plurality of traction motors based on the actual speed and the target speed;

determining a total power demand associated with the plurality of traction motors based on the respective torque commands and respective traction motor speeds;

determining a generator power limit based on the generator speed;

determining a limit ratio based on the total power demand and the generator power limit;

adjusting the respective torque commands of the plurality of traction motors based on the limit ratio; and causing an action to be performed based on the adjusted respective torque commands.

2. The method of claim 1, wherein determining the respective torque commands comprises:

determining a steering command based on the control signal;

determining respective speed commands associated with the plurality of traction motors based on one or more of the actual speed, the target speed, or the steering command, the respective speed commands being proportioned between the plurality of traction motors to cause steering of the work machine according to the steering command; and determining the respective torque commands based on the respective speed commands.

3. The method of claim 1, wherein determining the total power demand comprises:

determining respective power demands of the plurality of traction motors based on the respective torque commands; and determining the total power demand based on the respective power demands.

4. The method of claim 1, wherein determining the generator power limit comprises:

determining the generator power limit based on the generator speed and a generator torque limit.

5. The method of claim 1, wherein the limit ratio is configured to saturate to a value of 1.

6. The method of claim 1, wherein adjusting the respective torque commands comprises:

derating the respective torque commands by the limit ratio such that the total power demand approximates the generator power limit.

7. The method of claim 1, wherein causing the action to be performed comprises:

enabling the plurality of traction motors to be controlled according to the adjusted respective torque commands.

8. A device, comprising:

one or more memories; and one or more processors, communicatively coupled to the one or more memories, configured to:

receive a control signal for operating a plurality of traction motors of a work machine, the control signal including information relating to an actual speed of the work machine, a target speed of the work machine, and a generator speed of a generator operatively coupled to the plurality of traction motors;

determine respective torque commands associated with the plurality of traction motors based on the actual speed and the target speed;

determine a generator power limit based on the generator speed;

determine a threshold based on the respective torque commands and the generator power limit;

adjust the respective torque commands based on the threshold; and cause the plurality of traction motors to be operated based on the adjusted respective torque commands.

9. The device of claim 8, wherein the one or more processors, when determining the respective torque commands, are configured to:

determine a steering command based on the control signal;

determine respective speed commands associated with the plurality of traction motors based on one or more of the actual speed, the target speed, or the steering command, the respective speed commands being proportioned between the plurality of traction motors to cause steering of the work machine according to the steering command; and determine the respective torque commands based on the respective speed commands.

10. The device of claim 8, wherein the one or more processors, when determining the generator power limit, are configured to:

determine the generator power limit based on the generator speed and a generator torque limit.

11. The device of claim 8, wherein the one or more processors, when determining the threshold, are configured to:

determine respective power demands of the plurality of traction motors based on the respective torque commands and respective speeds of the plurality of traction motors;

determine a total power demand based on an aggregation of the respective power demands; and determine the threshold as a limit ratio, the limit ratio being determined based on a ratio between the generator power limit and the total power demand.

12. The device of claim 8, wherein the one or more processors, when adjusting the respective torque commands, are configured to:

derate the respective torque commands by a limit ratio, the limit ratio being determined based on a ratio between the generator power limit and a total power demand of the plurality of traction motors.

13. The device of claim 8, wherein the one or more processors are further configured to:

determine respective power demands of the plurality of traction motors based on the respective torque commands and respective speeds of the plurality of traction motors;

determine a total power demand based on an aggregation of the respective power demands;

compare the total power demand with the generator power limit; and derate the respective torque commands by a limit ratio based on determining that the total power demand exceeds the generator power limit, the limit ratio being determined based on a ratio between the generator power limit and the total power demand.

14. A work machine, comprising:
a first traction motor;
a second traction motor;
a generator operatively coupled to the first traction motor and the second traction motor; and
a controller configured to:
receive information relating to an actual speed of the work machine, a target speed of the work machine, and a generator speed of the generator,
determine, based on the actual speed and the target speed, a first torque command associated with the first traction motor and a second torque command associated with the second traction motor,
determine a total power demand based on the first torque command and the second torque command,
determine a generator power limit based on the generator speed,
determine a threshold based on the total power demand and the generator power limit,
adjust the first torque command and the second torque command based on the threshold to obtain an adjusted first torque command and an adjusted second torque command, and
cause an action to be performed based on the adjusted first torque command and the adjusted second torque command.

15. The work machine of claim 14, wherein the controller, when receiving the information, is configured to:
receive the target speed from a user interface of the work machine, and
receive one or more of the actual speed or the generator speed from a set of sensors associated with the work machine.

16. The work machine of claim 14, wherein the controller, when determining the first torque command and the second torque command, is configured to:
receive a steering command from a user interface of the work machine,
determine, based on one or more of the actual speed, the target speed, or the steering command, a first speed command associated with the first traction motor and a second speed command associated with the second traction motor,
the first speed command and the second speed command being proportioned to cause steering of the work machine according to the steering command,
determine the first torque command based on the first speed command, and
determine the second torque command based on the second speed command.

17. The work machine of claim 14, wherein the controller, when determining the total power demand, is configured to:
determine a first power demand of the first traction motor based on the first torque command and a first speed of the first traction motor,
determine a second power demand of the second traction motor based on the second torque command and a second speed of the second traction motor, and
determine the total power demand based on an aggregation of the first power demand and the second power demand.

18. The work machine of claim 14, wherein the controller, when determining the generator power limit, is configured to:
determine the generator power limit based on the generator speed and a generator torque limit.

19. The work machine of claim 14, wherein the controller, when determining the threshold, is configured to:
determine the threshold as a limit ratio,
the limit ratio being determined based on a ratio between the generator power limit and the total power demand, and
the limit ratio being configured to saturate to a value of 1.

20. The work machine of claim 14, wherein the controller, when adjusting the first torque command and the second torque command, is configured to:
derate the first torque command by a limit ratio,
the limit ratio being determined based on a ratio between the generator power limit and the total power demand, and
derate the second torque command by the limit ratio.

* * * * *